United States Patent
Cordes

(10) Patent No.: US 10,926,305 B2
(45) Date of Patent: Feb. 23, 2021

(54) METHODS AND SYSTEMS FOR DECONTAMINATING HARMFUL MATERIAL

(71) Applicant: Marc Cordes, Arlington, VA (US)

(72) Inventor: Marc Cordes, Arlington, VA (US)

( * ) Notice: Subject to any disclaimer, the term of this patent is extended or adjusted under 35 U.S.C. 154(b) by 0 days.

(21) Appl. No.: 16/049,110

(22) Filed: Jul. 30, 2018

(65) Prior Publication Data

US 2019/0039104 A1 Feb. 7, 2019

Related U.S. Application Data

(60) Provisional application No. 62/540,554, filed on Aug. 2, 2017.

(51) Int. Cl.
| | | |
|---|---|---|
| *B08B 15/02* | (2006.01) | |
| *B09B 3/00* | (2006.01) | |
| *B25J 21/02* | (2006.01) | |
| *B08B 3/02* | (2006.01) | |
| *B08B 1/00* | (2006.01) | |

(52) U.S. Cl.
CPC ............ *B08B 15/026* (2013.01); *B08B 1/001* (2013.01); *B08B 3/02* (2013.01); *B09B 3/00* (2013.01); *B09B 3/0075* (2013.01); *B25J 21/02* (2013.01)

(58) Field of Classification Search
CPC ........ B08B 15/02; B08B 15/026; B25J 21/02; E04H 1/1277; B09B 3/0075; B09B 3/00; F16J 15/00; F16J 15/02; F16J 15/021; F16J 15/022; F16J 15/10; A61G 11/009; A61G 11/00; A61G 11/006
USPC .......................................... 312/1; 600/21–22
See application file for complete search history.

(56) References Cited

U.S. PATENT DOCUMENTS

| | | | | | |
|---|---|---|---|---|---|
| 3,117,009 | A | * | 1/1964 | Boelter | A23C 19/0323 435/252.1 |
| 3,475,808 | A | * | 11/1969 | Woolsey | G21F 7/053 29/402.08 |
| 4,788,965 | A | * | 12/1988 | Milani | A61G 11/00 600/22 |
| 5,112,293 | A | * | 5/1992 | Vaccaro | A61G 11/00 128/205.26 |
| 5,861,305 | A | * | 1/1999 | Silley | B25J 21/02 312/1 |
| 6,553,722 | B1 | * | 4/2003 | Porret | B01L 1/02 49/507 |
| 6,591,662 | B1 | * | 7/2003 | Grimard | B01L 1/02 73/46 |
| 2005/0168117 | A1 | * | 8/2005 | Porret | B01L 1/02 312/291 |
| 2011/0067217 | A1 | * | 3/2011 | Giesen | B25J 21/02 29/402.02 |
| 2014/0150926 | A1 | * | 6/2014 | Nodin | B01L 1/02 141/311 A |

(Continued)

FOREIGN PATENT DOCUMENTS

DE            2600445 A1 * 7/1977 ............ G02B 7/007

OTHER PUBLICATIONS

Machine english translation of DE 2600445, Jul. 1977.*

*Primary Examiner* — Hiwot E Tefera
(74) *Attorney, Agent, or Firm* — Capitol Patent & Trademark Law Firm, PLLC

(57) ABSTRACT

Decontaminating access structures that allow the partial insertion of decontamination tools into glove boxes and the like to easily and safely decontaminate harmful materials are provided.

8 Claims, 9 Drawing Sheets

(56) References Cited

U.S. PATENT DOCUMENTS

| | | | |
|---|---|---|---|
| 2016/0052150 A1* | 2/2016 | Ni | B25J 21/02 312/1 |
| 2017/0202720 A1* | 7/2017 | Wakabayashi | A61G 11/006 |
| 2017/0341241 A1* | 11/2017 | Granet | B01L 1/02 |
| 2019/0084166 A1* | 3/2019 | Arizono | F16J 15/10 |

* cited by examiner

METHODS AND SYSTEMS FOR DECONTAMINATING HARMFUL MATERIAL

RELATED APPLICATION

The present application claims priority to U.S. Provisional Application No. 62/540,554 filed Aug. 2, 2017 (the "'554 Application"). The present application incorporates by reference herein in full the entire disclosures of the '554 Application as if set forth in full herein.

INTRODUCTION

So-called "glove boxes" are used to isolate bacteriological, chemical, radiological or other harmful agents or materials (collectively referred to as "harmful material' or just "material"). Glove boxes are used to ensure that harmful material being decontaminated, treated, tested or examined (collectively "treated" or "treat") remains uncontaminated and that the individual or individuals (e.g., police officers, firemen, emergency medical technicians, collectively "first responders") responsible for treating the harmful material are not exposed to the harmful material.

Sometimes first responders must treat the harmful material in the field before the material changes its condition. To do so, access must be given to the glove box via an opening or port ("port"). To date, however, existing glove boxes do not allow first responders to safely and quickly access such material. In other situations, harmful material must be safely decontaminated in the laboratory using a combination of a glove box and an air-lock. To date, such air-locks are bulky and relatively large.

Accordingly, it is desirable to provide for methods and systems that easily, yet safely, allow for the decontamination of harmful material.

SUMMARY

Figure 1:
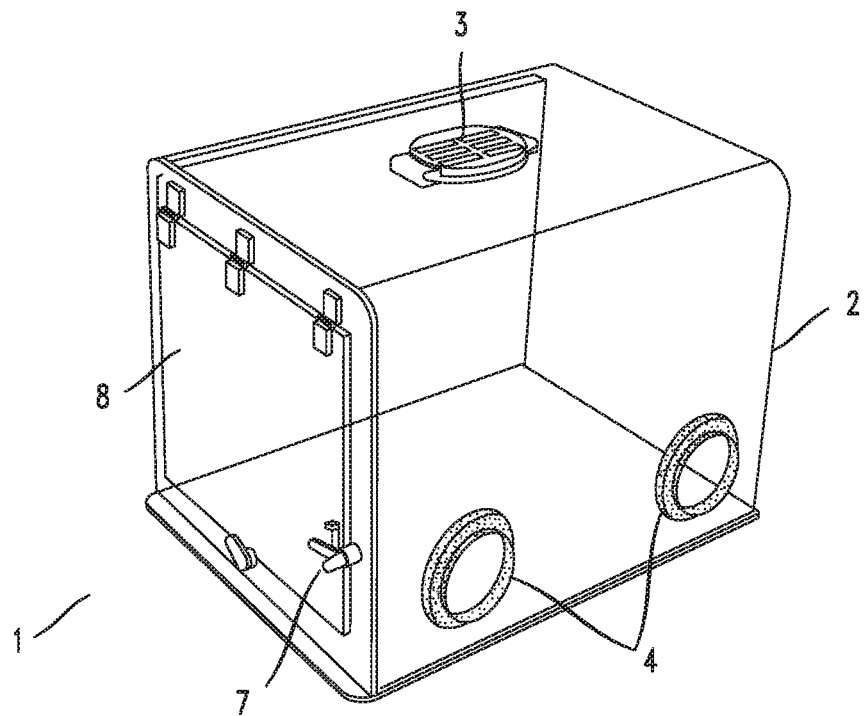
FIG. 1 depicts an exemplary embodiment of a system in accordance with the present invention.

The present invention provides for various embodiments for decontaminating harmful material. One such embodiment may comprise a structure configured to enclose harmful material (e.g., a glove box) in combination with a decontaminating access structure, where the decontaminating access structure may comprise: a pressure-activated latch mechanism; a rotatable hinge operable to insure that a rotatable hatch is in an open or closed position, wherein the hinge and latch mechanism function to securably close the hatch in the closed position; an outer, hollow frame configured to receive a first circumferential sealing means around a circumferential surface of the frame; an inner hollow frame; wherein the hatch, hinge, latch, outer frame, inner frame and first circumferential sealing means are operable to form a first seal to prevent harmful material from escaping the inside of the structure that encloses the harmful material and to prevent material from the outside from entering the structure when the hatch is in a closed position; a displaceable cover operable to receive a cover circumferential sealing means around a circumferential surface of the cover, wherein the cover and cover sealing means are operable to form a second seal to prevent harmful material from escaping the inside of the structure and for preventing material from the outside from entering the structure when the cover is in a closed position.

An exemplary latch may comprise a second circumferential sealing means for preventing harmful material from escaping the inside of the structure and for preventing material from entering the structure from outside the structure.

The decontaminating access structure may further comprise a bezel for securing a flexible, protective sleeve between the bezel and the inner hollow frame.

The exemplary access structure may be configured to allow partial insertion of a decontamination tool for substantially decontaminating the harmful material inside the structure configured to enclose the harmful material.

In addition to the systems described above the present invention further provides for decontaminating access structures. One such structure may comprise: a pressure-activated latch mechanism; a rotatable hinge operable to insure that a rotatable hatch is in an open or closed position, wherein the hinge and latch mechanism function to securably close the hatch in the closed position; an outer, hollow frame configured to receive a first circumferential sealing means around a circumferential surface of the frame; an inner hollow frame; wherein the hatch, hinge, latch, outer frame, inner frame and first circumferential sealing means are operable to form a first seal to prevent harmful material from escaping from the inside of a structure that encloses harmful material (e.g., a glove box) and to prevent material from the outside from entering the structure that encloses the harmful material when the hatch is in a closed position; a displaceable cover operable to receive a cover circumferential sealing means around a circumferential surface of the cover, wherein the cover and cover sealing means are operable to form a second seal to prevent harmful material from escaping the inside of the structure that encloses the harmful material and for preventing material from the outside from entering the structure that encloses the harmful material when the cover is in a closed position.

Once again, an exemplary latch may comprise a second circumferential sealing means for preventing harmful material from escaping the inside of the structure that encloses the harmful material and for preventing material from entering the structure that encloses the harmful material from the outside.

Such an exemplary decontaminating access structure may comprise a bezel for securing a flexible, protective sleeve between the bezel and the inner hollow frame, and may be configured to allow partial insertion of a decontamination tool for substantially decontaminating the harmful material inside the structure configured to enclose the harmful material.

In addition to the systems and decontaminating structures described above and herein, the present invention further provides for related and parallel methods. One such method may comprise: partially inserting a decontamination tool into a flexible, protective sleeve that is securably connected to a decontamination access structure, the access structure itself being connected to, or a part of, a glove box, and the access structure further comprising at least: a pressure-activated latch mechanism; a rotatable hinge, wherein the hinge and latch mechanism function to open a hatch to partially insert the tool and to securably close the hatch; an outer, hollow frame configured to receive the partially inserted tool and to receive a first circumferential sealing means around a circumferential surface of the frame; an inner hollow frame configured to receive the tool; completely sealing the surfaces where the partially inserted tool and sleeve meet using an appropriate sealing tape; and forcing the tool against a displaceable cover to displace the cover.

DETAILED DESCRIPTION, INCLUDING EXAMPLES

Exemplary embodiments of methods and systems for decontaminating harmful material are described herein. Although specific exemplary embodiments are discussed herein, there is no intent to limit the scope of the present invention to such embodiments. To the contrary, the exemplary embodiments discussed herein are for illustrative purposes. Modified and alternative embodiments may be implemented without departing from the scope of the present invention. Said another way, the exemplary embodiments presented herein are only some of the many that fall within the scope of the present invention, it being practically impossible for the inventors to describe all the many possible exemplary embodiments and variations that fall within the scope of the present invention.

It should also be understood that one or more exemplary embodiments may be described as a process or method. Although a process/method may be described as sequential, such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes all combinations of one or more of the associated listed items. As used herein, the singular forms "a," "an" and "the" are intended to include the plural form, unless the context and/or common sense indicates otherwise. It should be further understood that the terms "comprises", "comprising,", "includes" and/or "including", when used herein, specify the presence of stated features, systems, subsystems, steps, operations, elements, and/or components, but do not preclude the presence or addition of one or more other features, systems, subsystems, steps, operations, elements, components, and/or combinations thereof.

As used herein, the designations "first", "second", etc., is purely to distinguish one component (e.g., element, component, side, etc.,) or part of a process from another and does not indicate an importance, priority or status. In fact, the component or parts of a process could be re-designated (i.e., re-numbered) and it would not affect the operation of the enclosures or methods provided by the present invention.

Yet further, when one part of a system is described or depicted as being connected to another part using "a connection" (or single line in a figure) it should be understood that practically speaking such a connection (line) may comprise (and many times will comprise) more than one physical connection.

It should be noted that the systems and methods illustrated in the figures are not drawn to scale, are not representative of an actual shape or size and are not representative of any actual enclosure, system, layout, manufacture's drawing or visual. Rather, the systems are drawn to simply help explain the features, functions and processes of exemplary embodiments of the present invention described herein and covered by the claims set forth at the end of this description. Similarly, it should be noted that the dimensions, shapes, designs, performance, and positions described herein and/or shown in the figures herein, are merely exemplary, and may be changed to fit a specific application/use/environment.

As used herein, the term "embodiment" or "exemplary" refers to one example of the present invention.

As used herein the phrase "operable to" means "function to". As used herein the phrase "decontaminate" and its tenses means at least "sterilize" and its tenses. The phrase "material" means a substance in any form, such as a solid (e.g., powder), liquid, semi-liquid, paste, semi-solid, gas, semi-gas or vapor or some combination of the above, and "harmful" includes "harm" to a human being, animal or plant or some combination of the three.

As used herein "hollow" describes a structure that has an opening as viewed in a cross sectional area.

Referring now to FIG. 1 there is shown an exemplary embodiment of a system 1 comprising a structure configured to enclose harmful material 2 (e.g., a glove box) in combination with a decontaminating access structure in accordance with the present invention. It should be noted that while only a few of the features of the system 1 shown in FIG. 1 will be discussed herein, the scope of the present invention includes all of the features shown in FIG. 1 (as well as the other Figures).

Before discussing the elements of system 1 it should be noted that the shape of the structure 2 may take many forms, including the rectangular shape shown in FIG. 1. Further, the dimensions of the structure 2 may be varied to enclose material to be studied (e.g., drugs, anthrax, poisonous powders, etc.).

Structure 2 may comprise one or more transparent sides, a bottom portion and a top portion to allow a user of the structure 2 to view material within the structure 2. Each of the portions of the structure 2 may be connected using stainless steel connectors and components (not shown in FIG. 1). In an embodiment, the top portion may comprise the inventive decontaminating access structure 3 (e.g., a port), though it should be understood that the structure 2 may be configured to comprise an access structure 3 that is a part of a different element of the structure 2 (e.g., that is part of a side portion or bottom portion). In accordance with embodiments of the invention, the top, bottom and/or side portions may comprise a cast acrylic surface, polymer structure (transparent or white), glass, plexiglass, a polycarbonate or another suitable and analogous material.

Figure 2:
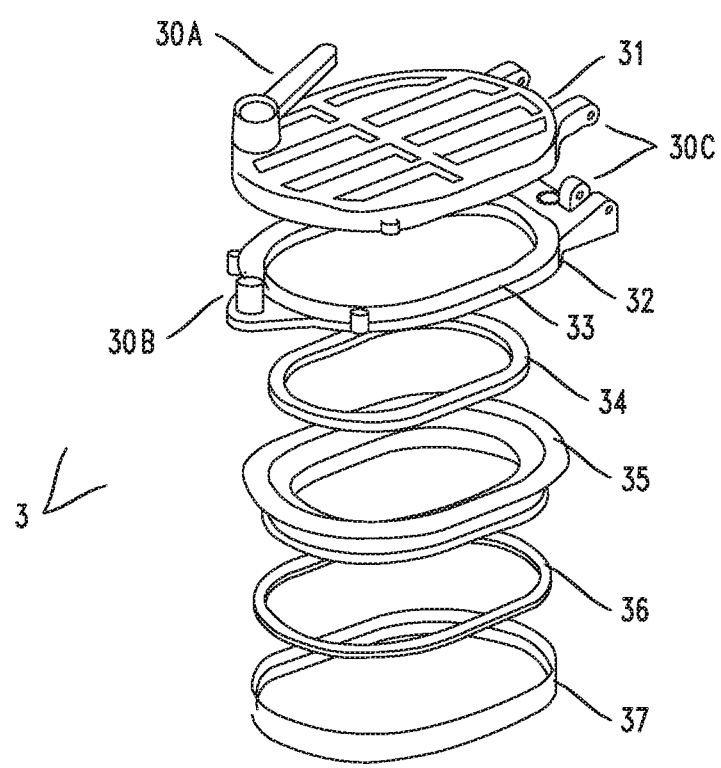
FIG. 2 depicts an exemplary embodiment of an access structure of a glove box in accordance with the present invention.

Referring to FIG. 2 there is depicted an exemplary embodiment of a decontaminating access structure 3 in accordance with the present invention. As shown, the access structure 3 may be configured to allow access to harmful material inside the structure 2. In an embodiment, the access structure may comprise a pressure-activated latch mechanism 30*a,b* (e.g., cam latch) and rotatable hinge 30*c* attached to a rotatable hatch or cover 31. In an embodiment, the hinge 30*c* may be operable to move the hatch 31 to an open or closed position. The structure 3 may further comprise an outer hollow frame 32 configured to receive a first circumferential sealing means 33 (e.g., elastomeric seal, gasket) around a circumferential surface of the frame 32 that is operable to prevent harmful material from escaping the inside of the glove box 2 and for preventing material from the outside from entering the structure 2.

Still further the structure may comprise a bezel 34 for securing a flexible, protective sleeve (see element 9 in FIG. 6) in between, or to, the inner hollow frame 35.

In an embodiment, the hatch, hinge, latch, outer frame, inner frame and first circumferential sealing means may be operable to form a first seal to prevent harmful material from escaping the inside of the structure that encloses the harmful material 2 and to prevent material from the outside from entering the structure 2 when the hatch 31 is in a closed position Continuing, the structure 3 may yet further comprise an inner displaceable cover or cap 37 (collectively "cover") operable to receive a cover circumferential sealing means 36 (e.g., O-ring) around a circumferential surface of the cover. In an embodiment, the cover 37 and cover sealing means 36 may be operable to form a second seal to prevent harmful material from escaping the inside of the structure 2 and for preventing material from the outside of the structure 2 from entering the structure 2 when the cover 37 is in a closed position.

Though not shown in FIG. 2 the hatch 31 may also include another ("second") circumferential sealing means (e.g., gasket) inserted, or received into, a channel on the underside surface of the hatch 31 to prevent harmful material from escaping the inside of the structure 2 and for preventing material entering the structure 2 from the outside, where the channel and gasket may be configured around a circumference of the underside surface of the hatch 31.

Figure 7:
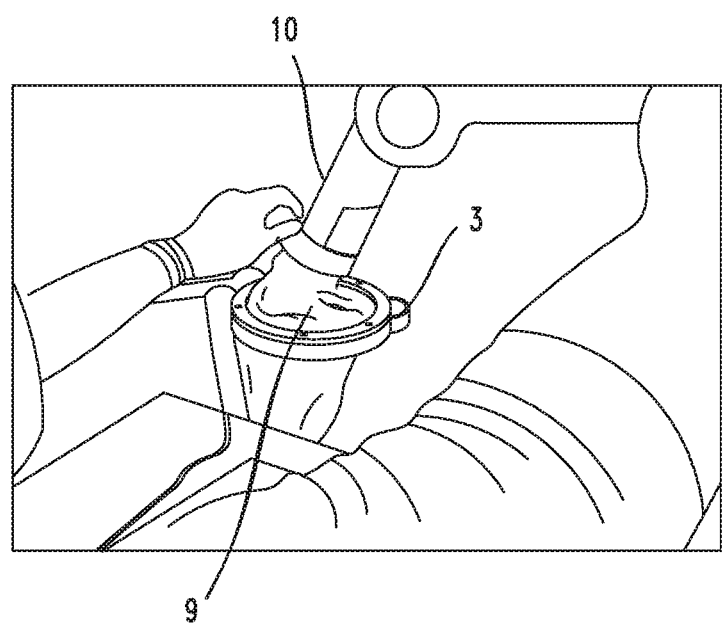
FIG. 7 depicts the partial insertion of a decontamination tool into an exemplary access structure according to an embodiment of the invention.

In an embodiment, the access structure 3 may be configured in size (dimensions) and shape (e.g., oval) to allow partial insertion of a decontamination tool (e.g., a decontamination sprayer, see FIGS. 7 to 9) through the sleeve 9 and access structure 3 for substantially decontaminating harmful material inside the glove box 2 as well as decontaminating a substantial amount of the interior surfaces of the structure 2.

Thus, in one embodiment the structure 3 may comprise a dual-level of protection from harmful material within the glove box 2. For example, the first level of protection is provided by elements 30*a* to 35, that are operable to create a first seal to prevent harmful material from escaping, and yet provide access when such material is to be decontaminated and a second level of protection provided by elements 36,37 just prior to decontamination. In an embodiment, the cap 37 may be configured to open only upon insertion of a decontamination tool into a sleeve and when part of the so-inserted tool (e.g., nozzle of a sprayer) pushes against the cap 37, for example (see FIGS. 6 to 9). Thus, in an embodiment the entire tool need not be inserted into the structure 2 to decontaminate the harmful material. This is inapposite to some existing systems that use a glove box in combination with an air-lock, where the tool is fully inserted into the air lock. Said another way, inventive systems that include the dual protection features described above and elsewhere herein allow a decontamination tool to be partially inserted into a glove box prior to operation of the tool while still maintaining a seal to prevent harmful material from escaping the glove box as the tool is being inserted. Still further, inventive systems that include the dual protection features described above and elsewhere herein allow a decontamination tool to be partially inserted into a glove box during operation of the tool while still maintaining a seal to prevent harmful material from escaping the glove box as the tool is being operated as explained in more detail herein.

In sum, the inventive decontaminating access structure 3 allows a user of the system 1 to quickly and safely decontaminate harmful material inside the structure 2 by only partially inserting a decontamination tool into the structure 2 while still preventing harmful material from escaping the interior of the structure 2.

In one embodiment, the elements 30*a* to 35 and 37 of the access structure 3 may comprise a rigid, yet lightweight, carbon reinforced nylon composition, for example. Further, in embodiments the bezel 34 may be configured to be easily replaced from the outside of the structure 2 as necessary and the element 36 and second circumferential sealing means may be made of various materials, such as rubber or another elastic polymer, an ethylene propylene diene monomer, or a synthetic rubber to give just a few examples.

Figure 3:
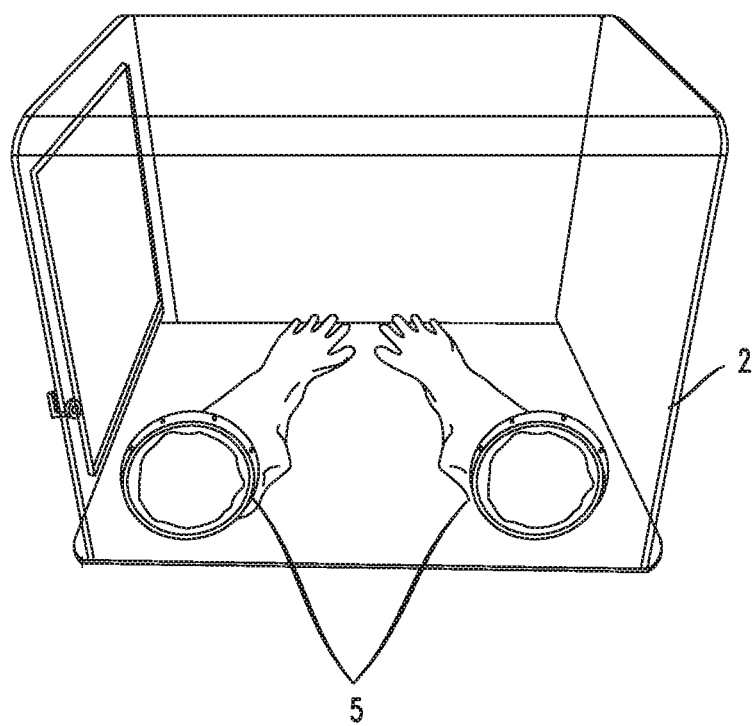
FIG. 3 depicts another exemplary embodiment of a system in accordance with the present invention.

Referring to FIG. 3 there is depicted another view of an exemplary system. As depicted the system may include the structure 2 that additionally comprises one or more "arms-length" removable gloves 5. Each of the gloves 5 may, for example, be made of a flexible material (shaped in a form, for example, of the outline of a person's arm and hand) and may be inserted into a passageway 4 (see FIG. 1) using an appropriate insert connector that includes a silicone O-ring. The O-ring for each glove 5 may be configured to securably retain a glove 5 to a side of the structure 2, in this case a glove box. In a completed glove-box in accordance with an embodiment of the invention, like glove-box 2 in FIG. 3, the gloves 5 allow a user to manipulate harmful material and other substances (e.g., decontamination substances) within the glove-box 2 or otherwise use any tool or accessory placed within the glove box 2 or made a part of a glove 5. The appropriate insert connector may form a Class 3 glove "port" for connecting a glove 5 to the glove box 2.

Figure 4:
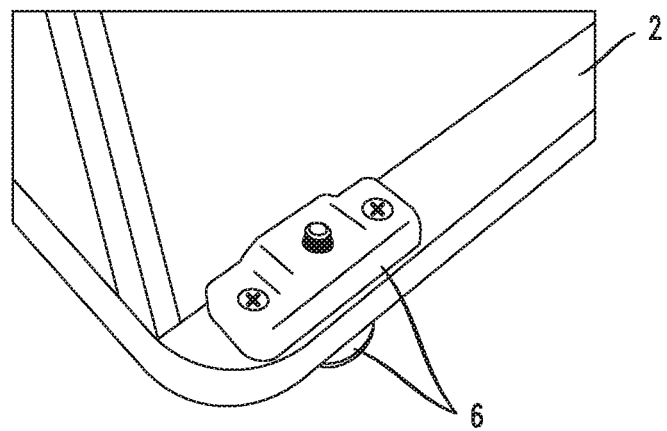
FIG. 4 depicts a view of an exemplary leveling means for a glove box according an embodiment of the invention.

FIG. 4 depicts an exemplary leveling means 6 for adjustably insuring that the structure 2 can be positioned on the substantially same plane (e.g., the bottom portion is all substantially within the same horizontal plane). In one embodiment, the structure 2 may comprise a leveling means on each corner of its bottom portion (e.g., four leveling means). A leveling means 6 may comprise, for example, a rotatable screw for raising or lowering a corner section of the bottom portion of the structure 2.

Figure 5:
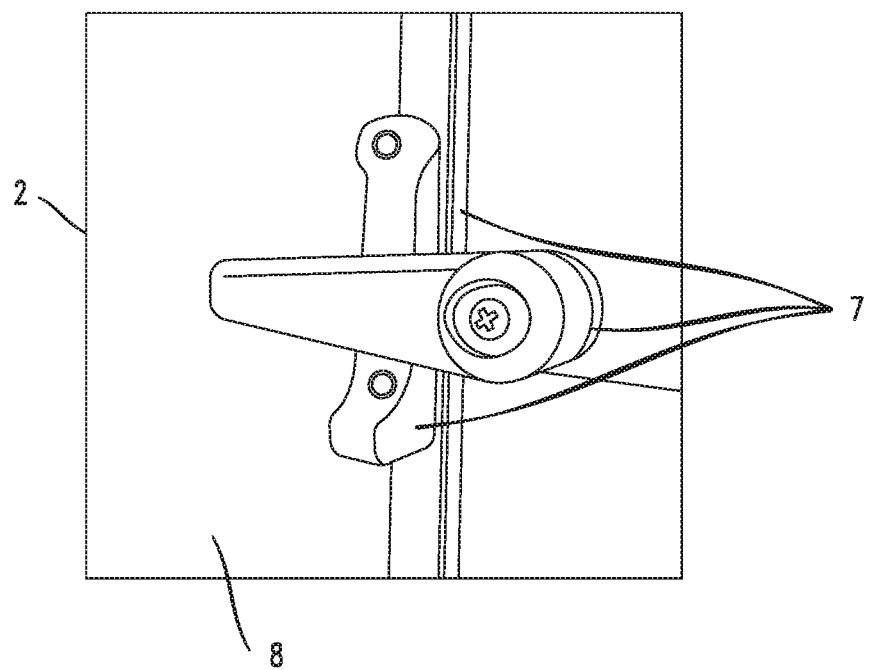
FIG. 5 depicts exemplary latch means for a glove box according to an embodiment of the invention.

FIG. 5 depicts second latch means 7 operable to open, close and seal a door 8 of an exemplary structure 2 according to an embodiment of the invention. In one embodiment, the structure 2 may be configured to comprise a plurality of second means 7 (e.g., 3) that are positioned such that they open and securably close the door 8 and form a seal in conjunction with gaskets that are positioned in between the door 8 and side of the structure 2 (not shown in Figures). In one embodiment, each of the second latch means 7 may comprise a rotatable latch that may be operable to rotate onto a corresponding ramped contact plate on the door 8 to open or close the door 8. When closed the second latch means may compress one or more inner gaskets.

In an embodiment, the gaskets are sufficiently compressed when the second latches are perpendicular with the contact plate. If more compression is needed the latches can be fully turned until it hits the stop at the end of the corresponding contact plate.

The exemplary structures 2,3 shown in the figures and their subcomponents or elements may be made using molds, molding methods and 3-D printing, for example.

Figure 6:
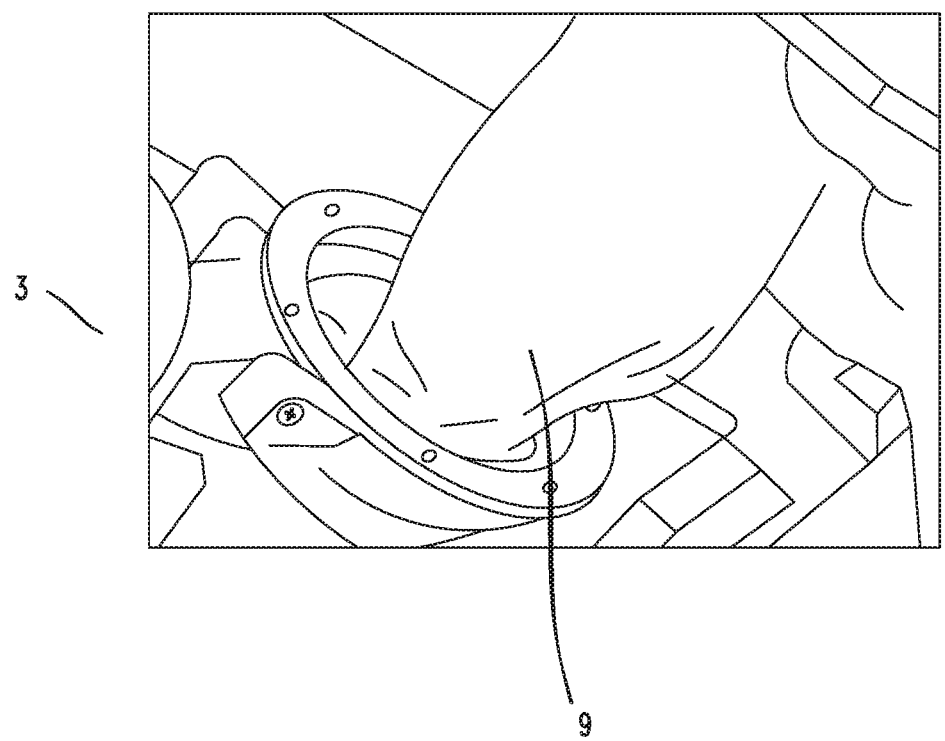
FIG. 6 depicts a view of an exemplary element of an access structure according to an embodiment of the invention.
Figure 8:
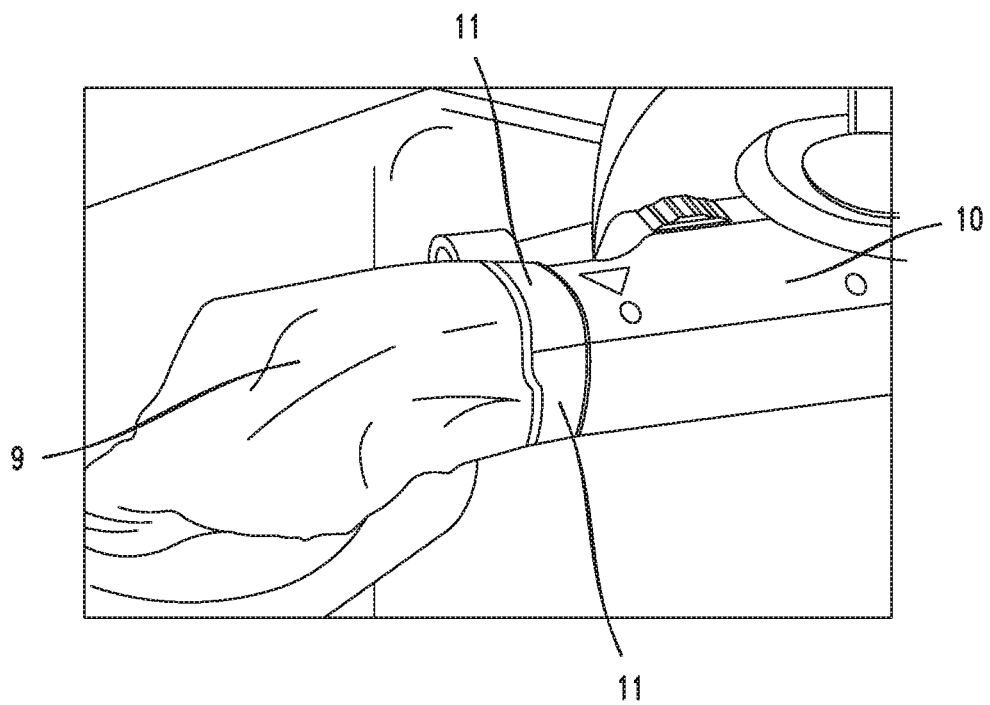
FIG. 8 depicts connection means for connecting a tool to the exemplary access structure according to an embodiment of the invention.
Figure 9:
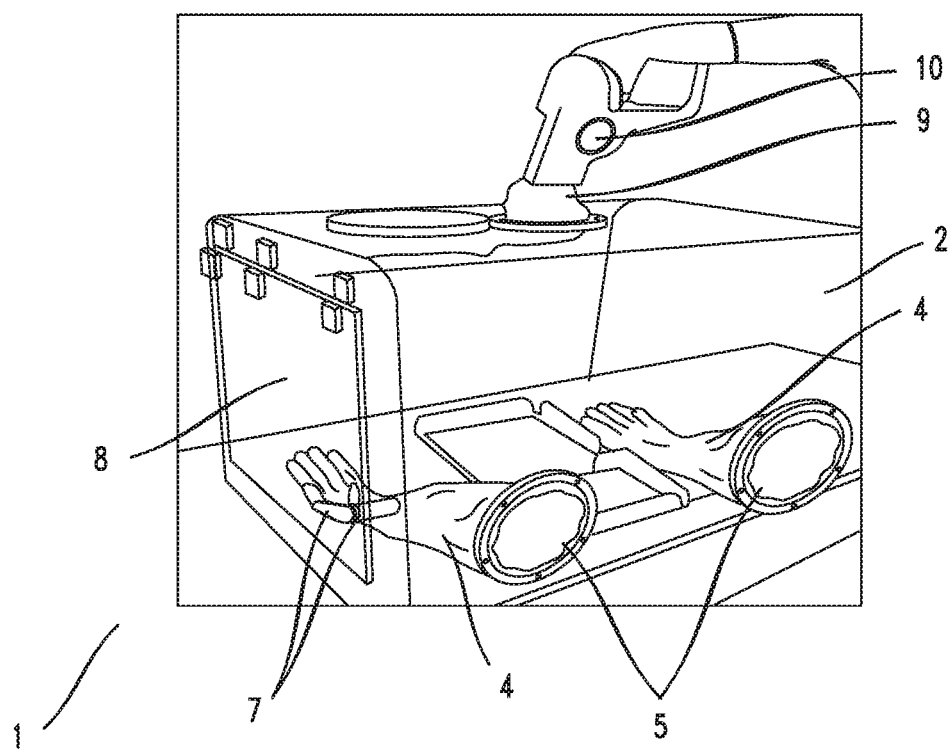
FIG. 9 also depicts the partial insertion of a decontamination tool into an access structure according to an embodiment of the invention.

FIG. 6 depicts an exemplary flexible, protective sleeve 9 that may be part of an access structure 3. In an embodiment, the sleeve 9 may be securably held in between bezel 34 and inner frame 35, for example (other positions for the sleeve are possible). In an embodiment, upon operating the pressure-activated latch mechanism 30a,b the hatch 31 may be rotatably opened to reveal the sleeve 9. The sleeve may be expanded to allow insertion of a tool, such as the decontaminating sprayer 10 depicted in FIG. 7, for example. In an exemplary method, once the tool 10 is partially inserted into the sleeve 9 by inserting a front portion of the tool 10 within the inner channel of the sleeve 9 (at least approximately 2 inches), the tool 10 may be connectable sealed to the sleeve 9 using connection means (e.g., a vinyl adhesive tape) as depicted in FIG. 8, for example, to form an appropriate seal around the circumference of the end of the tool 10. Thereafter, the tool 10 may be further inserted into the sleeve 9 until it makes contact with the displaceable cover 37 (see FIG. 2) causing the cover 37 to fall into the structure 2, for example, and allowing decontamination of the harmful material inside the structure 2 by a decontaminating substance (spray, powder) that may be emitted from the tool 10 upon operation of the tool 10 (see FIG. 9). The decontaminating substance emitted from the tool 10 may treat the material inside the structure 2 by falling upon (i.e., making contact with) the material within the structure 2, for example. Thus, as depicted in FIG. 9 the tool 10 need not be fully inserted into the structure 2 to decontaminate the harmful material inside.

When decontamination of the harmful material inside the structure 2 is complete, the tool 10 that is within the sleeve 9 may be withdrawn from the sleeve 9, the sleeve 9 may be removed or replaced and/or the hatch 31 and latch 30 may be placed over the other elements of the access structure 3 shown in FIG. 2 to close off the access structure 3 and seal the structure.

It should be noted that some systems that use an air lock to completely surround a tool (or other material) must also be routinely decontaminated after each usage. While decontamination of the structure 3 may occur, due to the relative small size of the structure 3 in comparison with typical size of an air-lock, it is believed that such decontamination is greatly simplified.

The description above provides some examples of the scope of the present invention. It is not intended to be an exhaustive description of the many examples of the invention. Such a description would be impractical to write. Variations of the examples given within are considered to be within the scope of the present invention.

What is claimed is:

1. A glove box configured to enclose harmful material, the glove box comprising: a decontaminating access structure, the decontaminating access structure comprising;
    a pressure-activated latch mechanism;
    a rotatable hinge; a rotatable hatch; wherein the hinge is operable to rotate the entire rotatable hatch to insure that the rotatable hatch is in an open or closed position, wherein the hinge and latch mechanism function to securably close the hatch in the closed position;
    an outer, hollow frame; a first circumferential sealing means; wherein the outer hollow frame is configured to receive the first circumferential sealing means around a circumferential surface of the frame;
    an inner hollow frame;
    wherein the hatch, hinge, latch, outer frame, inner frame and first circumferential sealing means are operable to form a first seal to prevent harmful material from escaping the inside of the glove box that encloses the harmful material and to prevent material from the outside from entering the glove box when the hatch is in a closed position;
    a displaceable cover; a cover circumferential sealing means; wherein the displaceable cover is operable to receive the cover circumferential sealing means around a circumferential surface of the cover, wherein the cover and cover sealing means are operable to form a second seal to prevent harmful material from escaping the inside of the glove box and for preventing material from the outside from entering the glove box when the cover is in a closed position.

2. The glove box as in claim 1 wherein the latch comprises a second circumferential sealing means for preventing harmful material from escaping the inside of the glove box and for preventing material from entering the glove box from outside the glove box.

3. The glove box as in claim 1 wherein the decontaminating access structure may further comprise a bezel for securing a flexible, protective sleeve between the bezel and the inner hollow frame.

4. The glove box as in claim 1 wherein the decontaminating access structure is configured to allow partial insertion of a decontamination tool for substantially decontaminating the harmful material inside the glove box configured to enclose the harmful material.

5. A decontaminating access structure for a glove box comprising:
    a pressure-activated latch mechanism;
    a rotatable hinge; a rotatable hatch; wherein the hinge is operable to rotate the entire rotatable hatch to insure that the rotatable hatch is in an open or closed position, wherein the hinge and latch mechanism function to securably close the hatch in the closed position;
    an outer, hollow frame; a first circumferential sealing means; wherein the outer hollow frame is configured to receive the first circumferential sealing means around a circumferential surface of the frame;
    an inner hollow frame;
    wherein the hatch, hinge, latch, outer frame, inner frame and first circumferential sealing means are operable to form a first seal to prevent harmful material from escaping inside of a glove box that encloses harmful material and to prevent material from the outside from entering the glove box that encloses the harmful material when the hatch is in a closed position;
    a displaceable cover; a cover circumferential sealing means; wherein the displaceable cover is operable to receive the cover circumferential sealing means around a circumferential surface of the cover, wherein the cover and cover sealing means are operable to form a second seal to prevent harmful material from escaping the inside of the glove box that encloses the harmful material and for preventing material from the outside from entering the glove box that encloses the harmful material when the cover is in a closed position.

6. The structure as in claim 5 wherein the latch comprises a second circumferential sealing means for preventing harmful material from escaping the inside of the glove box that encloses the harmful material and for preventing material from entering the glove box that encloses the harmful material from the outside.

7. The structure as in claim 5 further comprising a bezel for securing a flexible, protective sleeve between the bezel and the inner hollow frame.

8. The structure as in claim 5 configured to allow partial insertion of a decontamination tool for substantially decontaminating the harmful material inside the glove box configured to enclose the harmful material.

* * * * *